United States Patent [19]

Kreft

[11] Patent Number: 5,206,495
[45] Date of Patent: Apr. 27, 1993

[54] CHIP CARD

[75] Inventor: H. D. Kreft, Dassendorf, Fed. Rep. of Germany

[73] Assignee: Angewandte Digital Elektronik GmbH, Fed. Rep. of Germany

[21] Appl. No.: 599,864

[22] Filed: Oct. 19, 1990

[30] Foreign Application Priority Data

Oct. 24, 1989 [DE] Fed. Rep. of Germany ....... 3935364

[51] Int. Cl.⁵ ............................................. G06K 19/06
[52] U.S. Cl. ................................... 235/492; 235/380; 235/487
[58] Field of Search ............... 235/487, 379, 380, 462, 235/488, 492; 902/4

[56] References Cited

U.S. PATENT DOCUMENTS

| | | | |
|---|---|---|---|
| 4,506,148 | 3/1985 | Berthold | 235/380 |
| 4,746,787 | 5/1988 | Suto et al. | 253/379 |
| 4,791,285 | 12/1988 | Ohki | 235/492 |
| 4,818,853 | 4/1989 | Ohta et al. | 235/492 |
| 4,853,526 | 8/1989 | Effing | 235/492 |
| 4,894,522 | 1/1990 | Elliot | 235/462 |
| 4,960,983 | 10/1990 | Inoue | 235/488 |

FOREIGN PATENT DOCUMENTS 3721170 1/1988 Fed. Rep. of Germany .
3721822 11/1988 Fed. Rep. of Germany .
3935364 8/1990 Fed. Rep. of Germany .

Primary Examiner—Harold Pitts
Attorney, Agent, or Firm—Hill, Steadman & Simpson

[57] ABSTRACT

A chip card capable of selectively transmitting data via contacts or transmission coils. The card includes a switching element device, preferably a multiplexer, coupled between a semiconductor device and contacts in a contact field and transmission coils. A voltage transmitted via the coils can be operative to automatically set the multiplexer for transmission via the coils.

10 Claims, 2 Drawing Sheets

CHIP CARD

BACKGROUND OF THE INVENTION

The present invention is directed to what are commonly referred to as chip cards. A chip card is a credit card sized card in which a semiconductor device (referred to as an electronic "chip") is included for data storage and/or processing.

More specifically, the invention is directed to a chip card wherein the energy supply and bidirectional data exchange are effected via contacts on the card.

A contacting chip card of the type to which the invention relates, also referred to as a portable storage medium, is described in German patent application DE 3721170 having corresponding U.S. Pat. No. 4,874,934, the teachings of which are fully incorporated herein by reference. It is set forth in the abstract of U.S. Pat. No. 4,874,934 that the card includes an integrated circuit memory for storing predetermined information which also is embossed on the surface of the card, and a central processing unit. When a read instruction is supplied from a portable memory medium handling system externally connected to a portable memory medium, the central processing unit reads out the predetermined information stored in the memory, and supplies it to the portable memory medium handling system, which then displays the information on a display unit. An operator compares the information displayed on the display unit with the information embossed on the portable memory medium, and thus determines the authenticity of the embossed information. The disclosed card can serve as a credit card for purchasing purposes.

In German Patent 3721822, the teachings of which are fully incorporated herein, there is disclosed a contact-free chip card including an integrated circuit which is accessed by a reader coupled to a terminal and which receives electrical energy via an inductive coupling. The card is made of an insulating material into which the integrated circuit is embedded on a carrier. At the center of the circuit, a digital processor is mounted. An antenna coil provided for transmission is wound concentrically around the active surface of the integrated circuit semiconductor body.

There exists an international ISO Standard 7816 for chip cards that have contacts for bidirectional data transmission. Both contact utilizing and contact-free chip cards are available in the marketplace. Contact utilizing chip cards usually conform to International ISO Standard 7816 for transmission of power and data. Data flow, data formats, and clock frequencies are also proposed for standardization for contact-free chip cards so that occupation of the contact field of such cards of different write/read modules is the same.

As with the card described in DE 3721822 C1, the transmission of power and data for a contact-free chip card usually is accomplished using general transformer principles. Transmission makes use of the properties of electromagnetic waves at various frequency ranges.

Commercially available contacting chip cards are currently subjected to increasing competition from contact-free chip cards due to the disadvantages of the use of contacts: wear, contact resistances, requirement of direct connections to the electronics, static charging via the contacts, and design limitations imposed by contact positioning, among others.

SUMMARY OF THE INVENTION

The present invention provides an improved chip card. More specifically, the invention provides a chip card that can be accessed via contacts or in contact-free fashion so that the chip card can be utilized in either contact card readers or contact-free card readers, respectively, without input from a card user.

To these ends, in an embodiment, the invention provides a chip card including both a contact field and transmission coils and a switching element device coupled between both and a semiconductor device such as a microcomputer. Preferably, the switching element device is operative to sense voltages provided via the contact field and/or the coils so as to effect selective data transmission between either the contact field or the coils and the semiconductor device on that basis.

In a preferred embodiment, the switching element device is a multiplexer having a first set of inputs/outputs coupled to the contact field, a second set of inputs/outputs coupled to the semiconductor device, and a third set of inputs/outputs coupled to the coils, and a trigger input operative to receive a signal that effects selective operation of said first or third set of inputs/outputs.

Additionally, a parallel/serial converter can be disposed between said coils and said third set of inputs/outputs to effect parallel serial data conversion and vice versa.

Yet further, a comparator can be included having a first input coupled to said contact field, a second input to said coils, and an output coupled to said trigger input of said multiplexer.

In a preferred embodiment, said comparator is operative to produce an output signal when a voltage is supplied thereto only via said coils but no output signal whenever a voltage is supplied thereto via said contacts.

In another embodiment, a voltage rectifier is disposed between said coils and said second comparator input.

These and other features as well as aspects of the invention will become apparent from the following description of the preferred embodiments and accompanying drawings.

DETAILED DESCRIPTION OF THE PRESENTLY PREFERRED EMBODIMENTS

In accordance with the invention, a chip card is configured for transmission of power and/or data via contacts and/or suitable receptors, e.g., such as coils. Such a card is illustrated schematically, in varying degrees of detail, in FIGS. 1–3.

Figure 1:
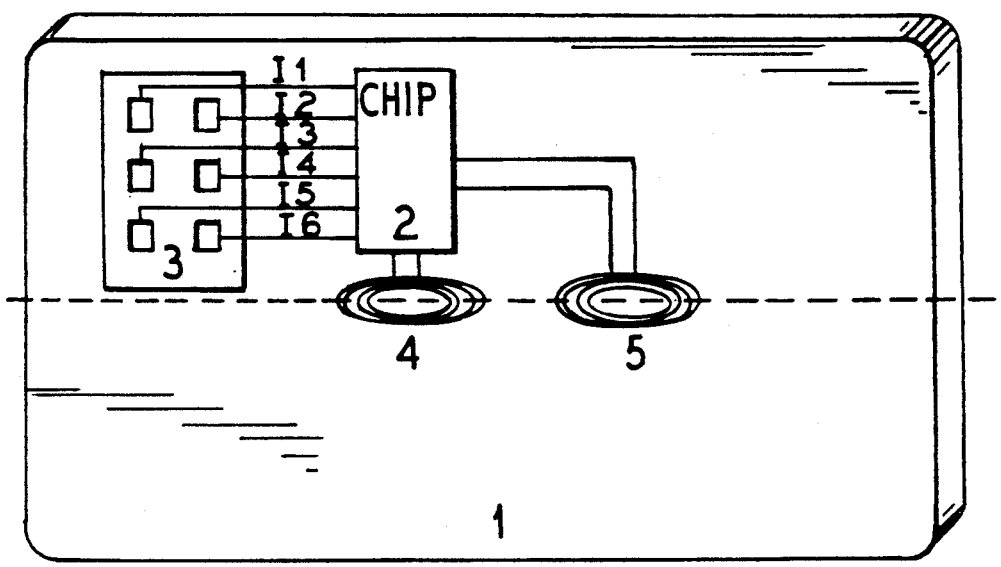
FIG. 1 is a simplified schematic diagram of a chip card.

With reference to FIG. 1, a chip card 1 is illustrated that includes a semiconductor device 2, such as an electronic chip including a microcomputer with an arithmetic unit and a memory, and a contact field 3. The contact field 3 conforms to International ISO standard 7816. The contacts in the contact field 3 are suitably coupled to the semiconductor device 2 via lines I1-I6.

Additionally provided are two coils 4 and 5, also coupled to the semiconductor device 2. These coils 4 and 5, like the contacts in the contact field 3, are configured for bidirectional transmission of data and for transmission of energy. The semiconductor device 2 includes suitable switching elements for selecting use of either the coils 4 and 5 or the contacts in the contact field 3 for data transmission.

Figure 2:
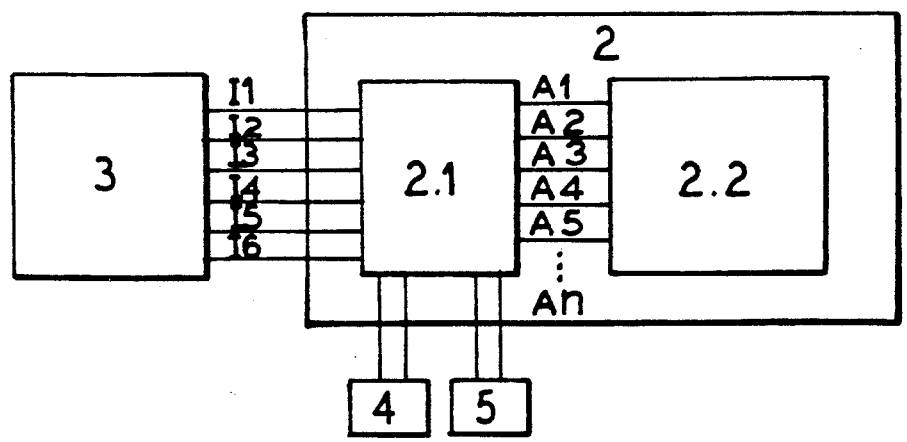
FIG. 2 is a more detailed schematic diagram of the chip card of FIG. 1 including a switching element device operative to selectively coupled a semiconductor device to a contact field or an induction transmission field.

In FIG. 2, the presently preferred position of such a switch element is illustrated. As can be seen, the semiconductor device 2 preferably comprises both a switching element device 2.1 and a microcomputer 2.2 with arithmetic unit and memory, which effects procedures of interest to a user of the card 1, such as, debiting an account, storing identification numbers, etc.

As illustrated, the switching element device 2.1 is disposed between the contact field 3 and the microcomputer 2.2. The switching element device 2.1 is coupled to the contact field via the lines I1-I6 and to the microcomputer 2.2 via lines A1-An. The coils 4 and 5 are then also suitably coupled to the switching element device 2.1.

Figure 3:
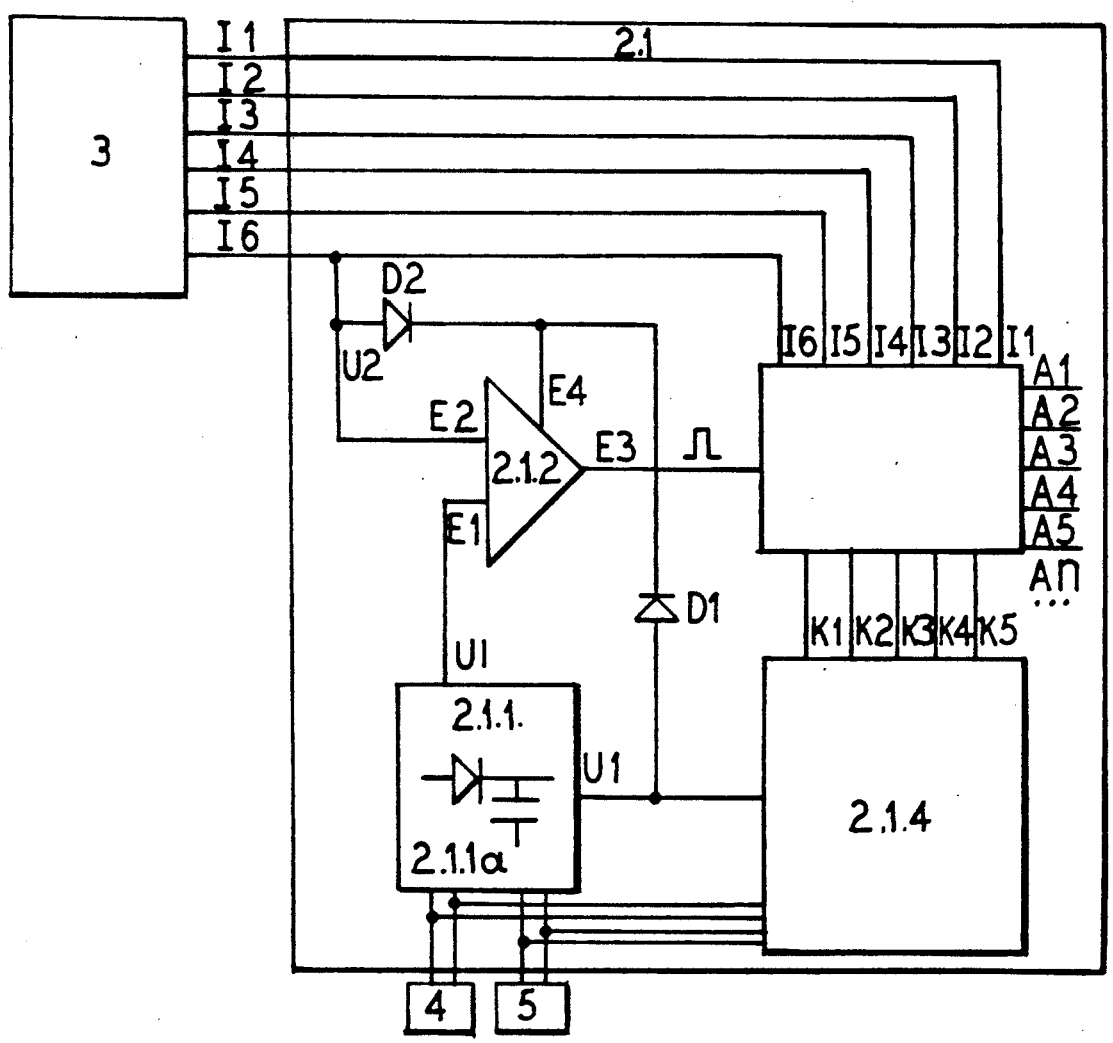
FIG. 3 is a schematic diagram illustrating in greater detail the switching element device of FIG. 2.

The switching element device 2.1 is illustrated in greater schematic detail in FIG. 3.

As illustrated, the coils 4 and 5 are coupled to both a current and voltage rectification device 2.1.1 and a serial/parallel converter 2.1.4. The rectifier 2.1.1 preferably uses a diode capacitor network 2.1.1a to make direct current and DC voltage U1 available to the entire semiconductor device 2 when energy is inductively transmitted to the card 1 via coils 4 and 5.

The switching element 2.1 further includes a comparator 2.1.2 operative to effect a comparison between voltages supplied via the coils 4 and 5 and the contact field 3. The DC voltage U1 is supplied to an input E1 of the comparator 2.1.2, preferably comprising an operational amplifier. Another input E2 of the comparator 2.1.2 is coupled to line I6 and, thus, to one of the contacts in the contact field 3, for receipt thereof of a voltage U2. A voltage supply input E4 of the comparator 2.1.2 is coupled to both the DC voltage U1 of rectifier 2.1.1 and to the line I6 via diodes D1 and D2, respectively. The comparator 2.1.2 produces an output signal at output E3, which output signal is supplied to a multiplexing unit 2.1.3.

The output signal at the output E3 of the comparator 2.1.2 preferably is unambiguously dependent on the voltage levels at the inputs E1 and E2. Preferably, when voltage U1 is present the output signal at E3 a level. In all other situations, for example the voltage U2 is present at input E2 (regardless of the presence of the voltage U1). The output signal at output E3 preferably has a value of zero. Thus, a clear indication is provided as to whether only the voltage U1 is present, or whether the voltage U2 is present.

Of course, if desired, the comparator 2.1.2 could be configured to provide the opposite result. That is to say, the comparator 2.1.2 could be configured to provide an output signal only when the voltage U2 alone is present but never when the voltage U1 is present.

As illustrated, the multiplexer 2.1.3, has parallel inputs/outputs coupled to the contacts in the contact field 3 via lines I1-I6. Additionally, further parallel inputs/outputs are coupled to the converter 2.1.4 via lines K1-K5. Finally, the multiplexer 2.1.3 has parallel inputs/outputs coupled to the microcomputer 2.2 via lines A1-An.

It can be appreciated that the multiplexer 2.1.3 can serve to select either the converter 2.1.4 or the contact field 3 the microcomputer 2.2 for transmission of data. Because the data provided by the multiplexer 2.1.3 to the microcomputer 2.2 is the same whether it originates from or is transmitted via the contact field 3 or the converter 2.1.4, the microcomputer 2.2 perceives no difference between contacting and contact-free use of the chip card 1.

It can be appreciated further that the output signal at output E3 is used to effect selective coupling of the microcomputer 2.2 to either the contact field 3 or the converter 2.1.4. Thus, if only an induced voltage U1 is present, the card 1 will automatically be set up for contact-free operation. Otherwise, the card 1 will automatically be set up for contacting operation. Thus, it can be appreciated that contact-free operation takes precedence over contacting operation.

While a preferred embodiment has been shown, modifications and changes may become apparent to those skilled in the art which shall fall within the spirit and scope of the invention. It is intended that such modifications and changes be covered by the attached claims.

I claim:

1. A chip card comprising:
   a contact field including contacts for bidirectional transmission of signals;
   coils for electromagnetic induction bidirectional transmission of signals;
   a semiconductor device; and
   a switching element device coupled to said contacts, said coils, and said semiconductor device operative to effect selective data transmission between said contacts or said coils and said semiconductor device.

2. The chip card of claim 1, wherein said switching element device comprises a multiplexer having a first set of inputs/outputs coupled to said contacts, a second set of inputs/outputs coupled to said semiconductor device, and a third set of inputs/outputs coupled to said coils.

3. The chip card of claim 2, wherein said multiplexer includes a triggering signal input operative to effect such selective coupling in accordance with receipt of a triggering signal at said triggering input.

4. The chip card of claim 2, including a parallel to serial converter coupled between said third set of inputs/outputs and said coils to effect conversion of serial data transmitted by said coils to parallel data and vice versa.

5. The chip card of claim 3 further comprising a comparator having one input coupled to one contact of said contact field and a second input coupled to said coils and an output coupled to said triggering signal input of said multiplexer.

6. The chip card of claim 2 further comprising a rectifier unit coupled between said coils and said second input of said comparator.

7. A chip card comprising:
   a contact field including a plurality of contacts for effecting bidirectional transmission of data with an external device;
   coils for effecting contact-free bidirectional transmission of information with an external device;
   a semiconductor device;

a switching element device coupled between said semiconductor device and said contact field and said coils, said switching element device comprising a multiplexer having a first set of inputs/outputs coupled to said contacts, a second set of inputs/outputs coupled to said semiconductor device, and a third set of inputs/outputs coupled to said coils;

a serial-to-parallel data converter disposed between said third set of inputs/outputs and said coils;

a comparator having one input coupled to one contact, a second input coupled to said coils, and an output coupled to said multiplexer, an output provided by said comparator operative to direct said multiplexer to selectively effect data transmission between either said contacts or said coils and said semiconductor device.

8. The chip card of claim 7, further comprising a rectifier disposed between said coils and said second input of said comparator.

9. The chip card of claim 7, wherein said comparator is operative to generate an output whenever a voltage is provided only at its second input.

10. A chip card comprising:

coils for voltage supply and data exchange;

a contact field including contacts for voltage supply and bidirectional data exchange;

a semiconductor device;

a serial-to-parallel/parallel-to-serial converter coupled to said coils;

a rectifier operative to rectify an AC voltage induced in the coils to a DC voltage;

a comparator having one input coupled to a contact in the contact field and a second input coupled to an output of the rectifier, the comparator being operative to generate an output voltage;

a multiplexer having a trigger signal input coupled to said comparator output, a first set of inputs/outputs coupled to said contacts in said contact field, a second set of inputs/outputs coupled to said semiconductor device, and a third set of inputs/outputs coupled to said converter.

* * * * *